Figure 1:
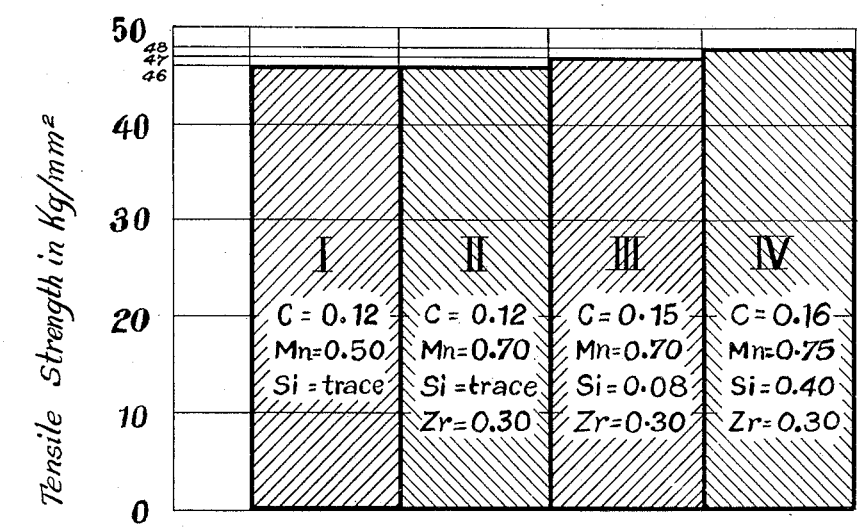

Dec. 27, 1938.  F. LEITNER  2,141,995
WELDING WIRE
Filed June 21, 1935

Inventor,
F. Leitner

Patented Dec. 27, 1938

2,141,995

UNITED STATES PATENT OFFICE 2,141,995

WELDING WIRE

Franz Leitner, Kapfenberg, Austria

Application June 21, 1935, Serial No. 27,769

4 Claims. (Cl. 219—8)

For electric welding high class work especially useful for work exposed to repeated stresses, a welding wire is required which possesses high tensile strength and high elongation as well as a high fatigue resistance in the weld. Until now, coated electrodes only could fulfill these requirements.

But coated electrodes have many drawbacks, which excludes them from a wide field of application. As a rule it is difficult to use them overhead or for vertical welding. Furthermore coated electrodes cause mostly undercutting in the parent metal, especially with fillet welds. These undercuttings weaken the parent metal in the transition zone and are a great danger on repeated stresses and shocks. X-ray tests have proved that the coating material often causes slag inclusions in the weld, thus lessening the fatigue resistance.

Removing slag from the weld is very tiresome and especially with welds consisting of several layers. The influence of heat developed by welding coated electrodes upon the base metal is great particularly in the case of high carbon steel or alloy steels. The heat injures the structure of the base metal and simultaneously the quality of the welded joint, and more particularly its fatigue resistance.

The extended heating of the welded construction involves great warping, rendering the work more difficult and making many precautions necessary.

Coated electrodes are very susceptible to decomposition by the influence of the atmosphere, furthermore they can be easily injured by handling them.

As a rule coated electrodes cannot be welded automatically. There are specially coated electrodes for this purpose of very complicated designs, but the results have not been satisfactory apart from the high costs for the manufacture of these electrodes. A special form is required to secure in the welding head an electrical contact with welding wire. A further difficulty is that in automatic welding mostly rings are used, their coating, however, being very difficult if not impossible.

Coated wires are generally so expensive that from the economical standpoint their use is not readily accepted. Bare electrodes on the other hand are cheap and have not the aforesaid drawbacks. They are furthermore suitable for automatic welding in the form of rings.

If bare electrodes are weldable at the negative pole they have a good penetration, as at the positive pole more heat is generated.

But common bare electrodes are in many cases not to be recommended, because of the unsatisfactory physical properties of the weld, e. g., a very poor elongation as well as a poor fatigue resistance. Welding with alternating current is practically impossible.

Now, the invention consists of a bare electrode, having all the advantages of ordinary bare electrodes—being for instance weldable from the ring—giving at the same time good physical properties, easy weldability at the negative pole and also with alternating current. To attain this object the wire must be alloyed in a special way and provided with a core of special composition.

For the alloying, certain elements, especially manganese, silicon and zirconium in definite proportions to one another must be present. But the invention is not confined to these three alloying elements, manganese, silicon, zirconium, only; any other element favoring the weldability and bringing about good qualities of the weld can be used.

To secure the desired effect, the silicon content must be at least 0.20% and not over 0.80%, the manganese content at least 0.30% and not over 1.30% and the zirconium content must be at least 0.1%. The upper limit of the silicon is 3%.

Figure 2:
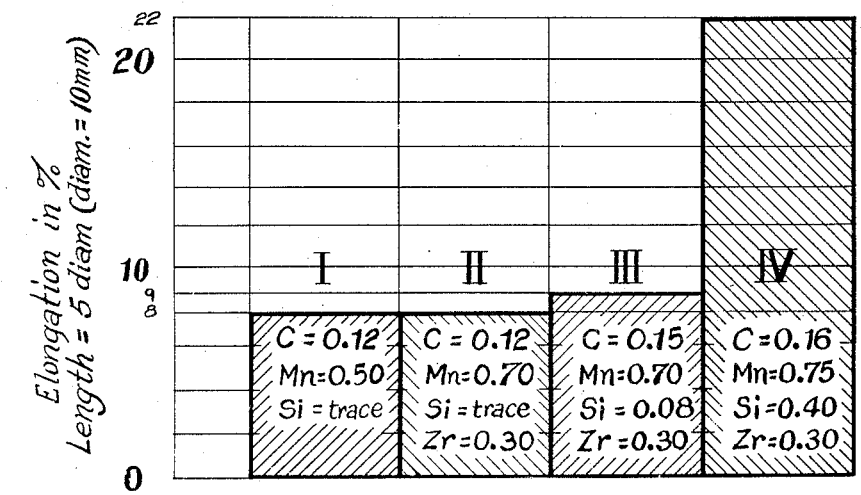
Figure 3:
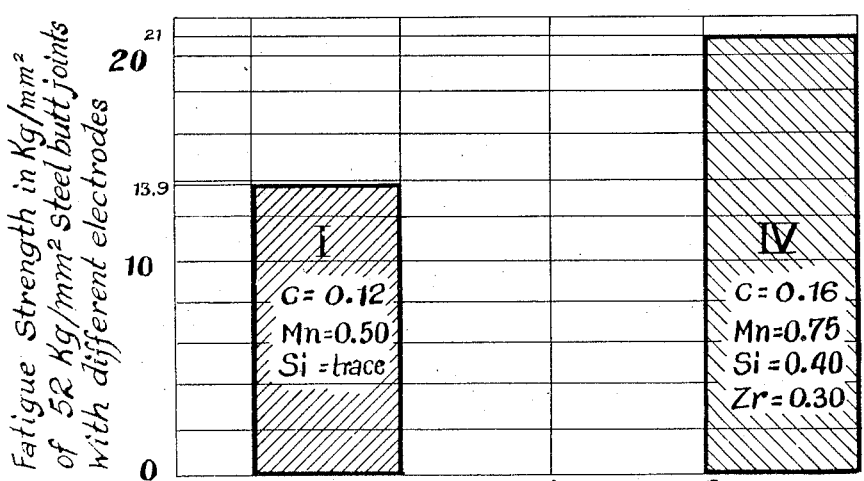

Figures 1, 2 and 3 are diagrams showing how the physical properties of wires according to the invention surpass those of electrodes of other composition. It is essential to consider the figures of all diagrams as a whole. Alloy 4 is an example of the invention, whereas the invention does not comprise alloys 1, 2 and 3.

Concerning the tensile strength alloy 4 does not greatly excel the three other ones, but the elongation of 22% is as good as that of a coated wire, notwithstanding the fact that the composition chosen is not the best one yet. The figures of fatigue resistance show a very high value for the wire according to the invention and are not surpassed by any coated electrode.

To attain different values of tensile strength it needs only to vary the manganese, silicon and zirconium content and to add if necessary other alloying elements known to give good physical properties such as nickel for instance.

With a content of alloying elements as in this invention, for instance, namely, higher silicon, manganese and zirconium content, good joints cannot be obtained without using a core in the wire. Only with the help of the core is it possible to fully utilize the advantages given by the above named alloys, resulting in good weldability at the negative pole and with the use of alternating current.

Thus the invention creates a new type of electrodes, substantially cheaper than the coated electrodes and nevertheless fulfilling all the requirements of modern engineering. The core-wire manufactured according to the invention is practical for overhead and vertical welding, thus avoiding injurous undercutting while diminishing the amount of heat evolved as well as warping so that automatic welding meets with no difficulty.

In order to obtain good welding qualities at the negative pole and using alternating current it is advisable to provide additional means. According to the invention to secure good weldability at the negative pole with alternating current a core is provided. This core may consist of earth-alkalines or/and alkalines, of other earth-alkalines or/and earth-alkaline compounds containing oxygen; in certain cases earth-alkaline or/and alkaline-compounds free of oxygen can be added.

Applicant understands by alkalines and their compounds, such compounds which contain $Na_2O$ (sodium oxide) $Li_2O$ (lithium oxide), for example, oxides, carbonates, silicates. He also understands by earth-alkalines and their compounds such elements as CaO (calcium oxide) BaO (barium oxide) SrO (strontium oxide). On the other hand, alkali metals (potassium, sodium, lithium) or alkaline earth metals (calcium, barium, strontium) are not implied.

The weldability of common bare wires is very unfavorably influenced by alloying elements, especially if welding is done at the negative pole or with alternating current. The good welding qualities of the new bare electrodes and its new composition give the explanation for the good physical properties of the weld, especially of the high fatigue resistance.

These properties of the weld and the low manufacturing costs enable a universal use of the new electrodes.

I claim:

1. Improved welding core-wire containing iron as the major element and 0.35% to 0.80% Si, 0.40% to 1.30% Mn and 0.10% to 1.20% Zr, said core-wire also containing an element selected from a group consisting of alkalines and earth-alkalines.

2. Improved welding core-wire electrode according to claim 1 with a core containing elements selected from a group comprising alkaline-compounds free of oxygen.

3. Improved welding core-wire electrode according to claim 1 with a core containing elements selected from a group comprising alkaline-compounds free of oxygen, with addition of other heavy metal oxides and organic compounds.

4. Improved welding core-wire containing iron as the major element and at least 0.20% Si, at least 0.30% Mn, 0.10% to 3% Zr and as auxiliary metal 0.30% to 3.50% Ni for improving the physical properties of the wire, the core containing an element selected from a group consisting of alkalines and earth-alkalines.

FRANZ LEITNER.